(12) United States Patent
Rose et al.

(10) Patent No.: US 6,401,604 B1
(45) Date of Patent: Jun. 11, 2002

(54) CONVEYORIZED CHEESE BRINING APPARATUS

(75) Inventors: Scott J. Rose, Columbus; James L. Karpinsky, Poynette, both of WI (US)

(73) Assignee: Food Process Systems, Inc., Lodi, WI (US)

( * ) Notice: Subject to any disclaimer, the term of this patent is extended or adjusted under 35 U.S.C. 154(b) by 0 days.

(21) Appl. No.: 09/981,640

(22) Filed: Oct. 17, 2001

(51) Int. Cl.[7] .................. A01J 25/00; A23C 19/00; A23C 19/14; A23L 1/00
(52) U.S. Cl. .................. 99/455; 99/452; 99/517; 99/535
(58) Field of Search .................. 99/516, 517, 452–455, 99/534, 535, 460–466, 443 C, 443 R; 426/524, 582, 506; 62/64, 381, 374, 375

(56) References Cited

U.S. PATENT DOCUMENTS

| | | | | |
|---|---|---|---|---|
| 1,339,212 A | * | 5/1920 | Mackenrot | 99/443 R |
| 1,924,271 A | * | 8/1933 | Chapman | 99/517 X |
| 1,940,192 A | * | 12/1933 | Sorber | 99/455 X |
| 2,196,643 A | * | 4/1940 | Reeh | 99/452 X |
| 2,638,759 A | * | 5/1953 | Baris | 99/535 X |
| 3,405,455 A | * | 10/1968 | Strong | 99/443 C |
| 3,493,093 A | | 2/1970 | Hammer et al. | |
| 3,713,850 A | | 1/1973 | Gasbjerg | |
| 3,910,174 A | | 10/1975 | Nelles | |
| 3,923,071 A | | 12/1975 | Lada | |
| 4,068,014 A | | 1/1978 | Heimbruch | |
| 4,108,056 A | * | 8/1978 | Van Eltn et al. | 99/452 X |
| 4,206,238 A | | 6/1980 | Rothenbuhler | |
| 4,815,368 A | | 3/1989 | Nelles | |
| 4,869,161 A | * | 9/1989 | LaCount | 99/535 X |
| 4,902,523 A | * | 2/1990 | Fritchen et al. | 99/517 X |
| 5,018,440 A | | 5/1991 | Johnson | |
| 5,195,426 A | | 3/1993 | Thuli | |
| 5,505,608 A | * | 4/1996 | Tomatis | 426/582 X |
| 5,881,639 A | * | 3/1999 | Nesheim et al. | 99/452 X |

OTHER PUBLICATIONS

Wisconsin Professional Engineer, vol. 36, No. 5, Jul. 1995, pp. 1–2.
"Deep Pit Brining", Jake Nelles, Marschall Italian & Specialty Cheese Seminars, pp. 1–3, undated.
Intralox Modular Plastic Conveyor Belts, Belt Selection Guide, ©2000 Intralox, Inc 14516–IN, pp. 1–31.
"Automatic Vertical Serpentine Brine System" CAD drawing, c. 1995.

* cited by examiner

*Primary Examiner*—Timothy F. Simone
(74) *Attorney, Agent, or Firm*—Lathrop & Clark LLP

(57) ABSTRACT

A series of narrow and tall above-ground stainless steel tanks define independent brining cells into which cheese blocks are conveyed by common inlet and outlet flumes. Each cell has a removable conveyor assembly having a looped plastic link belt driven around a frame by an electric motor. Projecting plastic flights on the belt engage infed cheese blocks, and submerge a series of rows of blocks. An infeed flume delivers a stream of cheese blocks to a cell. Once a level below a flight is filled, the conveyor is actuated to submerge that level, and the next level is then filled until the tank is filled. After brining, the conveyor is incremented to discharge the cheeses flight by flight into an outlet flume.

27 Claims, 4 Drawing Sheets

CONVEYORIZED CHEESE BRINING APPARATUS

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to cheese brining apparatus in general, and in particular to automated cheese brining systems.

The production of many types of cheese requires that after the cheese blocks or loafs have been formed, they be exposed to a salt solution for a period of hours. This brining process has been practiced for centuries, sometimes on individual loafs, and in more recent times on large quantities of cheeses in batch or continuous processing apparatus.

In one widely used process, the molded cheese blocks, which usually have a density slightly less than the salt water in which they are floated, are advanced along brine filled flumes along a serpentine path. The submerged portions of the cheeses are thus exposed to brine, while the portions of the cheese which float above the fluid are subjected to a continuous spray of brine. One drawback to the use of brine sprays is the wide dispersion of the corrosive saltwater throughout the plant environment, imposing significant cleaning burdens, and creating an dificult work environment. In addition, to provide for a smooth flow of the blocks, a generous quantity of brine is required, imposing additional space and brine processing demands.

Another common process advances the cheese blocks from the flume into a rack composed of multiple stacked porous shelves. The rack is suspended over a brine tank and positioned with the lowermost shelf to receive a series of cheeses. As each shelf is filled, the rack is indexed downward to receive additional cheese blocks, until all the shelves have been filled, at which point the rack is entirely submerged for a period of time until the desired brining has been achieved. The process is then reversed with the rack being elevated one shelf at a time until all the cheeses have been discharged. However, since the last cheeses loaded will be the first unloaded, this process does not yield complete uniformity of cheese residence time within the brine. Moreover, the rack systems are often raised and lowered by hydraulic actuators, which must be carefully maintained to avoid contamination of the food product.

What is needed is a compact and easily maintained cheese brining apparatus which facilitates uniform brining of the cheese.

SUMMARY OF THE INVENTION

The cheese brining apparatus of the present invention has a series of narrow and tall above-ground stainless steel tanks which define independent brining cells into which cheese blocks are floated by common inlet and outlet flumes. Each cell receives a conveyor assembly having a looped belt formed of plastic links which is driven around a frame by an attached electric motor. The belt has evenly spaced outwardly protruding plastic flights. The infeed flume delivers a stream of cheese blocks to a cell. Once the entire length of the cell is filled, the belt is advanced one increment such that a belt flight engages the array of cheese blocks, causing them to submerge within the brine contained in the cell. The cell then receives another row of cheese blocks, and is again incremented, until all the submerged flights engage cheese blocks. The belt has a downward run which joins an upward run, such that the two runs diverge as the loop extends upwardly. The flights, which are approximately perpendicular to the belt itself, are thus always inclined downwardly, helping to retain the cheese blocks between the flight and the main body of the belt. The conveyor is halted once the cell is fully loaded, and gates are operated in the infeed flume to direct subsequent cheese blocks to another cell. After the desired residence time of a load of cheese blocks within a cell, the cell is opened to the outlet flume, a brine current is introduced and the conveyor is operated to successively bring each row of cheese blocks into position to be discharged.

It is an object of the present invention to provide a cheese brining system in which the first cheese blocks into the brine tank are also the first cheese blocks out of the brine tank.

It is also an object of the present invention to provide a cheese brining system which permits segregation of treatment of cheese blocks.

It is another object of the present invention to provide a cheese brining system which permits tracking of individual cheese blocks.

It is a further object of the present invention to provide a cheese brining system which may be entirely automated.

It is yet another object of the present invention to provide a cheese brining system requiring reduced quantities of brine.

It is a further object of the present invention to provide a cheese brining system which reduces opportunities for foreign material to enter the brine.

It is a still further object of the present invention to provide a cheese brining system with high densities of cheese blocks.

Further objects, features and advantages of the invention will be apparent from the following detailed description when taken in conjunction with the accompanying drawings.

DESCRIPTION OF THE PREFERRED EMBODIMENTS

Figure 1:
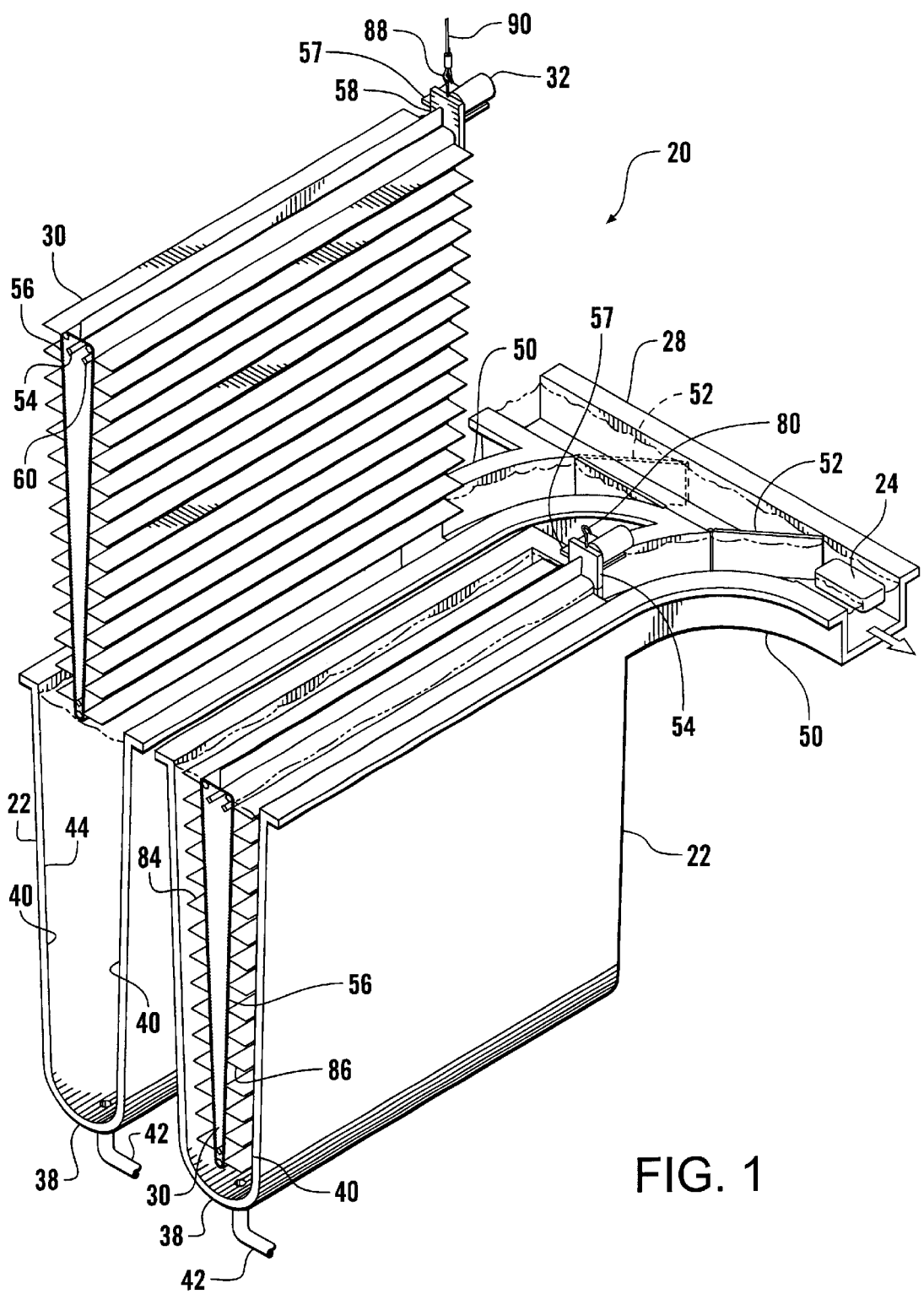
FIG. 1 is a fragmentary isometric view of the conveyorized cheese brining system of this invention, showing one conveyor assembly being removed from a brine tank for service.
Figure 2:
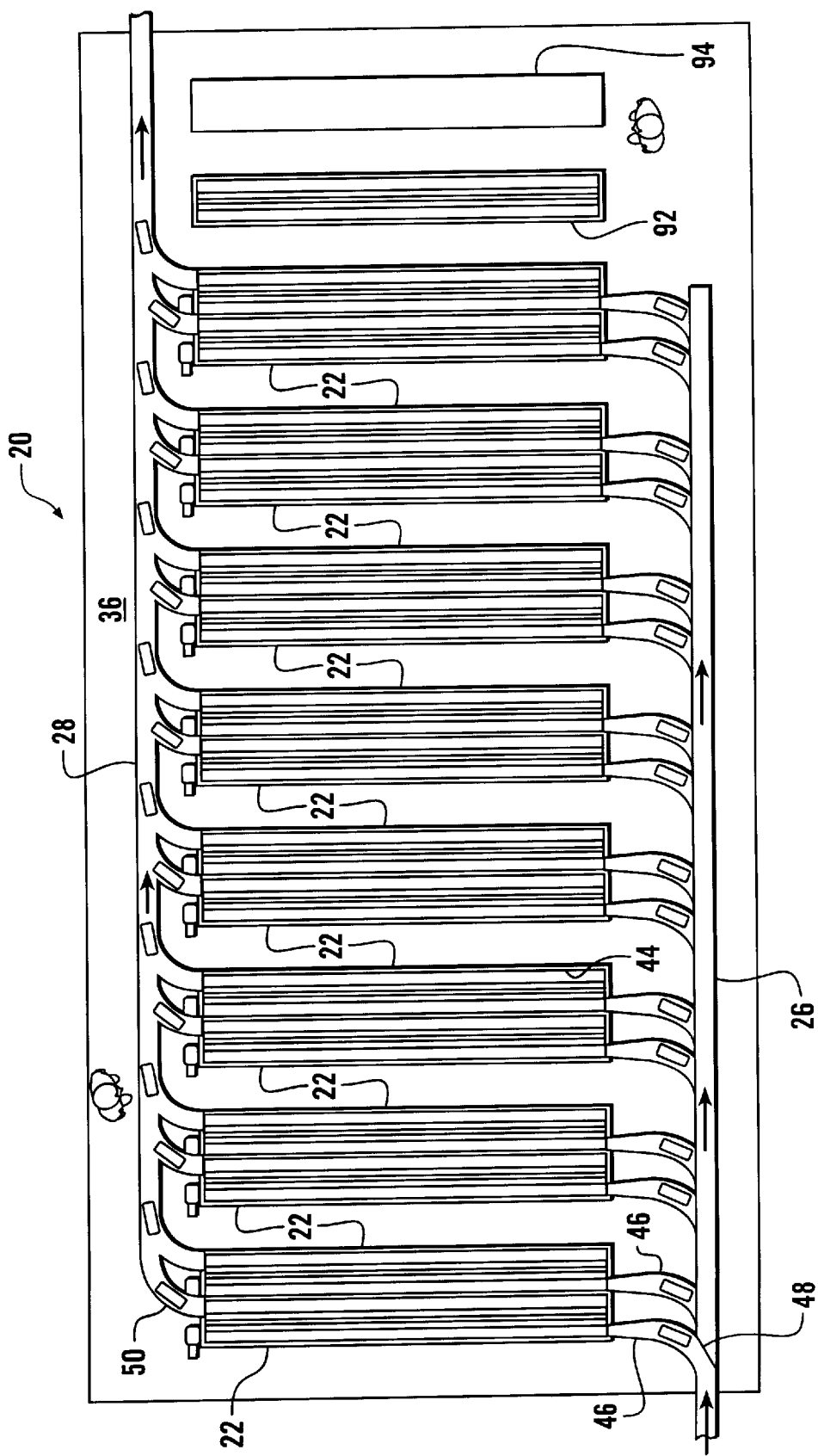
FIG. 2 is a top plan view of the conveyorized cheese brining system of FIG. 1.

Referring more particularly to FIGS. 1-4, wherein like numbers refer to similar parts, the conveyorized cheese brining system 20 of this invention is shown generally in FIG. 2. The system 20 has a sequence of aboveground brine tanks 22 which receive cheese blocks 24 from a common inlet flume 26 and which discharge the cheese blocks after brining to a common outlet flume 28. Each brine tank 22 has a conveyor assembly 30 which operates independently of the other conveyor assemblies and which is driven by its own electric drive 32.

Figure 3:
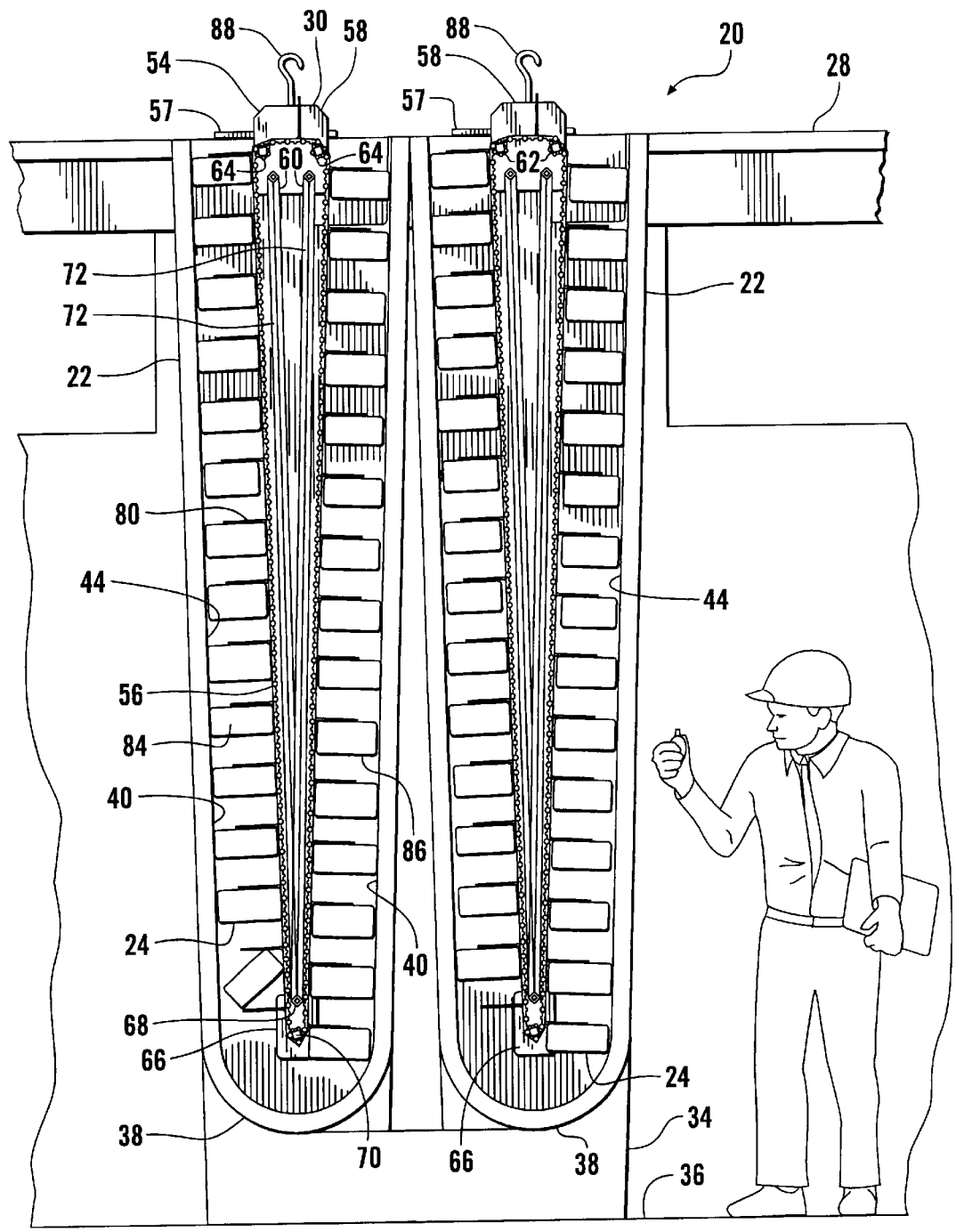
FIG. 3 is a cross-sectional view of two brine tanks of the system of FIG. 2 taken along section line 3-3.

As shown in FIG. 1, the brine tanks 22 are preferably positioned side-by-side in pairs and are supported by a support structure 34, shown schematically in FIG. 3, on the factory floor 36. The dimensions of the assembly 20 described hereafter are for purposes of example, although it should be noted that installations of varying sizes and capacities may be formed depending upon the requirements of the particular cheese production facility. The brine tanks 22 have a semicylindrical bottom wall 38 with two upwardly extending side walls 40 which diverge as they extend upwardly to an opening of about 32 inches. The side walls 40 are preferably formed of T316 stainless steel. The side walls 40 will typically be reinforced with exterior bars or trusses, not shown, and may be insulated. The tanks may extend to about 12 feet above the factory floor 36. The pairs of brine tanks 22 are preferably spaced about two feet apart to permit ready access to the tank exteriors for inspection, cleaning, and maintenance. Catwalks, not shown, are preferably supported between the tops of the tanks 22 to permit ready access to the tank interiors from above. The brine tanks 22 are preferably located in a sump type set up, that is, they are erected within a below grade excavated structure, but are not themselves submerged directly in the ground. This arrangement provides comfortable working and viewing height from the main floor. In addition, the sump configuration allows available ceiling height in the room to be used for an overhead crane 90, described below.

Each tank 22 has a drain pipe 42, as shown in FIG. 1, and is provided with brine supply piping, not shown, which provides a motive force for discharging cheese blocks 24 as described more fully below. Each tank 22 receives a conveyor assembly 30 and, when filled with brine, defines a single cell 44 in the assembly 20. As shown in FIG. 2 the common inlet flume 26 and common outlet flume 28 are parallel to one another, with the brine tanks 22 positioned between the two flumes, and generally perpendicular to the flumes. As shown in FIG. 1, the flumes 26, 28 are connected to the individual brine tanks at the upper levels of the tanks. The inlet flume 26 has curving inlet segments 46 which connect the flume to each of the brine tanks 22 at fluid inlets. Each inlet segment 46 may be provided with a controllable inlet gate 48 for selectively introducing a flow of cheese blocks 24 into a particular tank 22. Similarly, outlet segments 50 extend from each brine tank 22 to the outlet flume 28 on an end opposite the inlet segments. The outlet segments 50 extend from fluid outlets in the tanks, and provide for the discharge of the cheese blocks. Outlet gates 52 may be provided in each outlet segment 50 for controlling discharge of cheese blocks 24 from the tanks 22. The inlet gates and outlet gates preferably are provided with pneumatic actuators which allow a controller, such as a PLC, to operate the gates to control the flow of cheese blocks. The flumes 26, 28, and inlet segments 46 and outlet segments 50 have a narrow design configuration to prohibit the turning of the blocks of cheese as they navigate the system. The blocks flow the sweet way, i.e., the long axis of each block is aligned with the direction of travel. Thus the width of the flumes 26, 28 is preferably less than the length of the cheese blocks to be handled by the system.

The conveyor assembly 30 is substantially submerged within the brine within a tank. As shown in FIG. 3, each conveyor assembly 30 has a stainless steel tubular frame 54 to which a continuous looped belt 56 is mounted. The frame has end flanges 57 which extend outwardly over the tank, and engage against the upper lip of the tank to support the conveyor assembly 30. The belt 56 may be a series 800 INTRALOX™ modular plastic belt having straight flights and EZ Clean sprockets available from Intralox, Inc., see www.intralox.com. The belt is preferably a flush grid type of the brine compatible variety. The frame 54 has upper end plates 58 on each end which are connected by upper struts 60 and which support two square axles 62 which turn in bearings, not shown. Sprockets 64 are fixed to the axles 62 along the length of the frame at regular intervals. One of the axles 62 is driven by an electric motor drive 32 which is mounted to the frame and which may extend exterior of the tank 22. And it should be noted that although two spaced axles and sprockets are illustrated, a single axle with larger sprockets may be substituted. Because the INTRALOX™ sprockets are available only with even numbers of sprocket teeth, if two upper axles are employed, an odd number of links 74 should extend between the sprockets on the two upper axles. The frame 54 has lower end plates 66 which are connected by a lower strut 68 and which support a lower axle 70 to which sprockets 64 are mounted corresponding to the positions of the upper sprockets. The upper struts 60 are connected by a vertical struts 72 to the lower strut 68.

Figure 4:
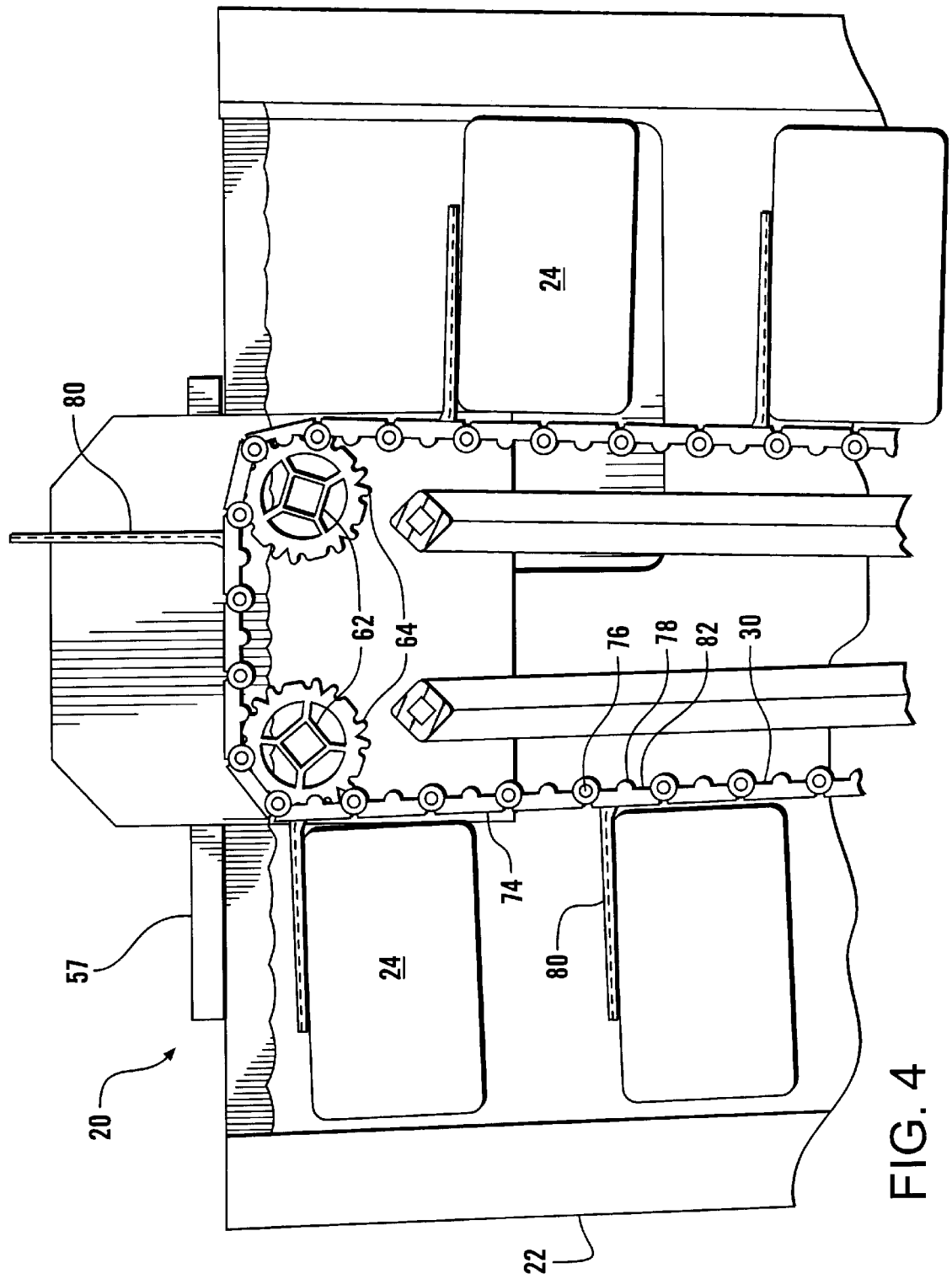
FIG. 4 is an enlarged fragmentary view of the conveyor assembly of FIG. 3.

As shown in FIG. 4, the modular belt 56 forms a continuous loop which is assembled from the modular plastic components. Each plastic component is formed of some food grade material such as polypropylene or nylon. The belt 56 has rigid plastic links 74 which are pivotably connected to one another at interdigitating hinged knuckles and secured with plastic pins 76. Flight links 78 are similar to the links 74, but have a plastic flight 80 which projects outwardly from the body 82 of the flight link 78. The flight 80 is a plastic barrier, shelf or protrusion, which extends approximately perpendicular to the body 82 of the flight link 78, and which serves both to separate one row of cheese blocks from another, and also to urge the blocks downwards along the downward run of the conveyor, and to resist the upward buoyant forces on the cheese blocks along the upward run of the conveyor. The flights 80 may project about 6-8 inches from the body 82, and are preferably provided with ribbed surfaces to minimize surface contact with the cheese blocks 24. The flight links are evenly spaced from one another, for example being connected by three standard links. The belt 56 has numerous molded perforations or openings that allow brine to flow around the backside of the cheese blocks. A dedicated brine recirculation flow system with its own pump works to move fresh chilled brine through the brine cells. The flow of brine across the stationary cheese blocks enhances the heat rejection of the cheese. It should be noted that additional fittings or flow restriction panels could be incorporated in the tank walls and conveyor frame to create zoned cooling or brine densities within each tank.

As shown in FIG. 3, the conveyor assembly 30 defines a downward run 84 where the flights 80 are moved toward the tank bottom wall 38, and a subsequent upward run 86 where the flights 80 move away from the tank bottom wall. The downward run 84 of the belt converges towards the upward run 86 at the bottom of the tank 22. Because of this convergence, each run of the belt is inclined from the vertical about 4.5 degrees. However, this inclination could be greater depending on the type, size, and style of the cheese.

As a result, the plastic flights 80, which extend perpendicular to the belt, are all angled downwardly. This downward angling of the flights 80 helps to urge the cheese blocks toward the belt and keep the blocks from jamming against the tank side walls 40. As the belt progresses through the tank, the cheese blocks are restrained between the belt and one of the side walls. Because the belt loops around the frame, the cheese blocks are prevented from coming into contact with the frame. The operation of the conveyor assembly advances cheese blocks from the inlet of the tank to the outlet of the tank, over a circuitous route that passes beneath the conveyor assembly.

The cheese brining system 20 is installed as part of a cheese manufacturing facility, such as one for the production of mozzarella cheese. Cheese blocks 24 from the facility's molding system discharge conveyor are dropped into the high flow capacity common brine inlet flume 26 as best shown in FIG. 2. A flow rate sufficient to motivate the cheese blocks 24 is generated by a sanitary centrifugal pump, not shown.

The cheese blocks 24 may be of various sizes and weights, for example about 21 inches long, four inches tall, and 7½ inches wide. Such a block weighs about twenty pounds. A central controller, for example a PLC, not shown, controls the gates 48 with pneumatic actuators to divert the flow of cheese blocks into a designated cheese-brining cell 44. The PLC may be a conventional Allen Bradley industrial controls, and will be provided with sensors and view panels. All brine contact areas, plumbing, and pumps should be T316 stainless steel with a passivated finish.

A typical cheese brining system 20 may employ eight pairs of brine tanks 22 positioned parallel to one another. A row cavity for the reception of cheese blocks is defined between each pair of submerged belt flights 80. In the illustrated conveyor assemblies 30, each having thirty flights 80, twenty-nine submerged row cavities are defined. For 20 pound cheese blocks, twelve blocks are received within each row cavity. Hence, about 348 cheese blocks may undergo brining within each brine tank 22. Each tank 22 is filled with cheese blocks 24 one row cavity at a time. The belt 56 is advanced such that the topmost flight 80 is submerged within the brine within the tank below the level of the floating cheese blocks 24.

The cheese blocks 24 are then carried into the brine tank 22 above the submerged topmost flight 80 until such time as a full-load sensor determines that the maximum number of cheese blocks for that row cavity have entered. The full-load sensor may be a vision system, or an electric eye sensor detecting the passage of each cheese block into the tank, or an adjustable capacitance cell sensor which is able to detect the passage of a cheese block through the brine, and which permits the counting of cheese blocks entering the brine tank. Such sensors are described at http://www.ab.com/sensors/sensorstoday/capsensors.html and are available from Allen-Bradley.

A signal from the full-load sensor is conveyed to the controller indicating that a particular row cavity is filled. The controller then actuates the drive 32 to advance the belt to bring the next flight 80 down on top of the cheese blocks 24 and to submerge them within the tank 22. Once submerged, the cheese blocks 24 are trapped between the belt 56 on the inside, the side wall 40 on the outside, and a plastic flight 80 above and below. The advancement of the belt 56 to submerge the first row cavity opens up the surface of the tank to receive additional cheese blocks, and the loading is repeated until all the row cavities are filled.

When the conveyor assembly 30 is halted, the flights 80 on the downward run of the belt and the flights on the upward run 86 of the belt are each restraining an array of cheese blocks. It should be noted that the loads imposed on the belt are fairly low, because a typical cheese block is about 2 percent buoyant. Therefore, on the downward run the force required to submerge the blocks is a small fraction of the weight of the blocks, and on the upward run a similar small force is resisted by the flights. It will be noted that, as the belt turns around the lower axle 70, the cheese blocks move from being restrained on the underside of a downward run flight, to being restrained on the underside of an upward run flight, which was in its previous location the top side of a downward run flight.

Once the controller detects that a particular cell 44 is fully loaded, the inlet gate into that brine tank 22 is closed and the subsequent incoming cheese blocks from the molder are diverted to the next available cheese-brining cell. The loading sequence is repeated until all available cells 44 are filled. Once the cheese blocks have resided within the brine tanks the required period of time, usually about four to eight hours, the controller operates the outlet gate 52 connecting the cell to the outlet flume 28. The conveyor assembly is indexed to uncover the uppermost row cavity of cheese blocks on the upward run 86 allowing the cheese blocks to float on the surface of the tank. The floating cheese blocks are discharged from the tank 22 through the outlet segment 50 to the outlet flume 28. Motivation flow is provided by a high flow pump plumbed through a manifold with valves controlled by the controller. If new green cheese blocks are available at the time of unloading, loading may occur simultaneously on the downward run as the upward run flights are unloaded. The loading and unloading cycles are then repeated for each cell throughout the day. It will be noted that the entire operation of the cheese brining system 20 may be carried out automatically without manual intervention.

Cheese that has completed the brining sequence travels along the outlet flume 28 and to a discharge conveyor, not shown, which forwards the cheese blocks for processing and packaging.

Each frame 54 has upwardly protruding hooks 88 which may be engaged by an overhead crane 90 for removal of a conveyor assembly 30 from a tank and displacement of the removed assembly to a clean-in-place tank 92. The crane may be a small overhead gantry crane. The clean-in-place tank 92 may be similar in structure to one of the tanks 22, and is provided with internal manifolds to discharge fresh water and cleaning solution onto the conveyor assembly that is disposed therein. The clean-in-place tank 92 is preferably positioned parallel to the other tanks 22.

The far downstream end of the assembly 20 has an exposed maintenance support structure 94 which may also receive from the crane a particular conveyor assembly 30 for convenient access. The maintenance support structure 94 may be as little as elevated brackets supported on vertical beams which support the conveyor assembly in the same fashion as it would be supported within a tank 22, but which allow free access to conveyor assembly for maintenance. To minimize system downtime an additional conveyor assembly 30 may be kept on hand to be substituted into a tank when that tank's conveyor assembly is required to be cleaned or serviced.

A level sensor is provided in the system 20 to allow for makeup brine to be added as cheese blocks are removed from the system, or for brine to be removed as cheese blocks are added to the system.

The system 20 offers a number of advantages: The first cheese block into a tank is the first cheese block out of the tank, making possible consistent residency times. Because of the segregated brining cells, it is a simple matter to treat different batches of cheese differently. Preferably, each cell is sized to accommodate all the cheese blocks from a particular cheese batch. Moreover, this segregation permits the controller to track individual blocks and blocks from a particular vat and to notify packaging equipment of lot and vat identification. The narrow, tall tanks reduce the pumpage required to create high flow rates over the cheese and in the system. Because of the modular brining cells, it is possible to add additional capacity to the system with minimal downtime, since construction on additional tanks can be undertaken while continuing to operate some or all of the original installation, until the time comes to connect the flumes. In addition, if desired, the sump may be omitted, and the entire system may be erected above grade eliminating the need for excavation. Moreover, the system lends itself to modular prefabrication, reducing the construction time on site. Furthermore, because the brine tanks are not within the ground, the possibility of the leakage into the subsoil is minimized. In addition, the system requires less brine than prior art serpentine systems, reducing filtering, pasteurization, and refrigeration requirements. The system provides high storage density, eliminates overhead brine sprays, and thereby keeps the installation floors dry.

If desired, the individual cells may be provided with covers to keep foreign objects out of the brine and to limit contamination of the brine and to protect the room. It should be noted that, although a single belt has been illustrated for each conveyor assembly, the frame may support multiple side by side belts. Moreover, although the frame may be supported entirely from above the belt, structure may be provided in the end walls of the brine tanks to engage with structure on the frame for additional support.

The cheese units treated within the brining assembly of this invention have been referred to herein as cheese blocks. By such term is meant any discrete unit of cheese, of whatever exterior shape, and includes cheese loafs of any size and configuration.

It should be noted that in place of two side-by-side brine tanks 22, as illustrated, a single vessel may be formed with a divider in between which will receive two conveyor assemblies.

It is understood that the invention is not limited to the particular construction room and arrangement of parts herein illustrated and described, but embraces all such modified forms thereof as come within the scope of the following claims.

We claim:

1. A cheese brining apparatus comprising:
    a tank having a first side wall spaced from a second side wall, the tank defining at least one brining cell and having a fluid inlet and a fluid outlet, the cell having brine therein;
    a frame positioned within the tank;
    a looped belt which extends in a continuous path around the frame and which extends into the brine within the tank, wherein a plurality of flights protrude outwardly from the belt, the flights being positioned to engage floating cheese blocks introduced into the cell at the fluid inlet, and the cheese blocks are restrained between the belt and the tank first side wall as the belt extends downwardly, and the cheese blocks are restrained between the belt and the tank second side wall as the belt extends upwardly; and
    a drive mounted to advance the belt within the cell, and to drive the flights downwardly along a downward run to submerge the engaged cheeses within the cell, and then to restrain the floating cheeses along an upward run as the belt is returned to its original starting location.

2. The apparatus of claim 1 wherein the tank is fabricated of stainless steel and is supported on a support structure within a below ground sump.

3. The apparatus of claim 1 further comprising a plurality of tanks each having a fluid inlet, a fluid outlet, and a conveyor assembly within each tank for advancing cheese blocks from the fluid inlet to the fluid outlet, and wherein the fluid inlets of all the tanks are connected to a common inlet flume, and the fluid outlets of all the tanks are connected to a common outlet flume.

4. The apparatus of claim 1 wherein the tank has a first side wall and a second side wall which are joined at a bottom wall, and wherein the first side wall converges towards the second side wall as the side walls extend towards the bottom wall.

5. The apparatus of claim 4 wherein the belt as it extends along the downward run converges toward the belt extending along the upward run, and wherein the flights are angled downwardly from the horizontal as they are moved along the downward run and the upward run.

6. The apparatus of claim 1 wherein the belt is comprised of a plurality of rigid plastic links which are pinned together, and the flights are formed as portions of selected links.

7. The apparatus of claim 1 wherein the frame with the belt and drive are removable from the tank.

8. The apparatus of claim 7 further comprising a clean-in-place tank positioned generally parallel to the tank, and being dimensioned to receive the frame with the belt and the drive for cleaning thereof.

9. The apparatus of claim 1 further comprising a controller which advances the belt when it is determined that a volume under a flight is full.

10. A cheese brining apparatus comprising:
    a tank having opposed side walls which defines a brining cell having brine therein;
    a frame supported on the tank and having portions which are submerged within the tank, the frame having two upper side segments connected together, and two lower side segments connected together, and at least one upper axle is mounted between the two upper side segments, and at least one lower axle is mounted between the two lower side segments, the axles supporting a plurality of sprockets;
    a continuous looped belt mounted to the frame and encircling the upper axle and the lower axle, the belt having a plurality of flights which project outwardly from the belt toward a tank side wall, a downward run being defined between the belt as it extends downwardly from the at least one upper axle to the lower axle and one tank side wall, wherein cheese blocks are retained between said one tank side wall and the belt as they traverse the downward run and an upward run being defined between the belt as it extends upwardly from the lower axle to the at least one upper axle and another tank side wall, and wherein the cheese blocks are retained between said another tank side wall and the belt as they traverse the upward run; and
    a drive mounted to at least one axle to rotate the belt and to advance cheese blocks submerged within the brine in the tank down the downward run, beneath the lower axle, and up the upward run.

11. The apparatus of claim 10 wherein the tank is fabricated of stainless steel and is supported on a support structure within a below ground sump.

12. The apparatus of claim 10 wherein the tank has a fluid inlet adjacent the downward run, and a fluid outlet adjacent the upward run, and further comprising a plurality of tanks each having a fluid inlet, a fluid outlet, and a conveyor assembly within each tank for advancing cheese blocks from the fluid inlet to the fluid outlet, and wherein the fluid inlets of all the tanks are connected to a common inlet flume, and the fluid outlets of all the tanks are connected to a common outlet flume.

13. The apparatus of claim 10 wherein the tank opposed side walls comprise a first side wall and a second side wall which are joined at a bottom wall, and wherein the first side wall converges towards the second side wall as the side walls extend towards the bottom wall.

14. The apparatus of claim 13 wherein the belt as it extends along the downward run converges toward the belt extending along the upward run, and wherein the flights are angled downwardly from the horizontal as they are moved along the downward run and the upward run.

15. The apparatus of claim 10 wherein the belt is comprised of a plurality of rigid plastic links which are pinned together, and the flights are formed as portions of selected links.

16. The apparatus of claim 10 wherein the frame with the belt and drive are removable from the tank.

17. The apparatus of claim 16 further comprising a clean-in-place tank positioned generally parallel to the tank, and being dimensioned to receive the frame with the belt and the drive for cleaning thereof.

18. The apparatus of claim 10 further comprising a controller which advances the belt when it is determined that a volume under a flight is full.

19. A cheese brining apparatus comprising:
a first brine tank;
a first conveyor assembly positioned within the first brine tank, the first conveyor assembly having a looped belt which traverses a continuous path within the first brine tank, the belt having a plurality of flights which project outwardly from the belt, and a drive is mounted to advance the belt within the first brine tank such that a cheese block received within the tank is engaged by one of the plurality of flights and advanced downwardly within the first brine tank adjacent a first side wall and upwardly within the first brine tank adjacent a second side wall opposite the first side wall;
a second brine tank spaced from the first brine tank; a second conveyor assembly positioned within the second brine tank, the second conveyor assembly having a looped belt which traverses a continuous path within the second brine tank, the belt having a plurality of flights which project outwardly from the belt, and a drive is mounted to advance the belt within the second brine tank such that a cheese block received within the tank is engaged by one of the plurality of flights and advanced downwardly within the second brine tank adjacent a first side wall and upwardly within the second brine tank adjacent a second side wall opposite the first side wall;
an inlet flume extending between the first brine tank and the second brine tank;
at least one gate mounted within the inlet flume and operable to selectively introduce a sequence of floating cheese blocks within the inlet flume into either the first tank or the second tank; and
an outlet flume extending between the first brine tank and the second brine tank, the outlet flume being connected to receive brined cheese blocks from the first brine tank and the second brine tank.

20. The apparatus of claim 19 wherein the first tank and the second tank are fabricated of stainless steel and are supported on a support structure within a below ground sump.

21. The apparatus of claim 19 wherein the each tank has a first side wall and a second side wall which are joined at a bottom wall, and wherein the first side wall converges towards the second side wall as the side walls extend towards the bottom wall.

22. The apparatus of claim 21 wherein within each tank, the belt as it extends along the downward run converges toward the belt extending along the upward run, and wherein the flights are angled downwardly from the horizontal as they are moved along the downward run and the upward run.

23. The apparatus of claim 19 wherein each belt within a tank is comprised of a plurality of rigid plastic links which are pinned together, and the flights are formed as portions of selected links.

24. The apparatus of claim 19 further comprising:
a first gate positioned to control the movement of cheese blocks from the inlet flume into the first tank;
a second gate positioned to control the movement of cheese blocks from the inlet flume into the second tank; and
a controller which operates the first gate and the second gate to advance a flow of cheese blocks into first the first tank, and then, once a maximum number of cheese blocks have been received therein, to halt entry of cheese blocks into the first tank, and to direct cheese blocks into the second tank by adjusting the positions of the first gate and the second gate.

25. The apparatus of claim 24 further comprising:
a third gate positioned to control the movement of cheese blocks from the first tank out into the outlet flume; and
a fourth gate positioned to control the movement of cheese blocks from the second tank out into the outlet flume, and wherein the controller controls the positions of the third gate and the fourth gate to control discharge of cheese blocks from the first tank and the second tank into the outlet flume.

26. The apparatus of claim 19 further comprising:
a crane positioned above the first tank and the second tank to selectively engage the first conveyor assembly or the second conveyor assembly, and to extract the engaged conveyor assembly from within its tank; and
a clean-in-place tank spaced from the first tank and the second tank, and positioned beneath the crane, to receive therein the extracted conveyor assembly for cleaning and subsequent return to one of the first tank and the second tank.

27. A cheese brining apparatus comprising:
a brine tank having a first side wall and a second side wall, the first side wall and the second side wall converging to a bottom wall to define a brining cell;
a frame extending within the tank and having at least one upper axle with at least one sprocket affixed thereto, and at least one lower axle with at least one sprocket affixed thereto;
a looped belt mounted to the frame and encircling the upper axle and lower axle sprockets, wherein a drive is mounted to advance the belt in a drive direction, wherein the belt advances along a downward run between the at least one upper sprocket and the at least one lower sprocket as it moves downward within the tank, and the belt advances along an upward run between the at least one lower sprocket and the at least one upper sprocket as it moves upward within the tank, and wherein the upward run converges toward the downward run closer to the bottom wall of the tank, such that the downward run and the upward run are inclined from the vertical; and a plurality of flights which project outwardly from the belt, the flights on the downward run projecting toward the first tank side wall, and the flights on the upward run projecting towards the second tank side wall, the flights extending approximately perpendicular to the belt such that the flights are angled downwardly from a horizontal plane as they travel along the downward run and the upward run, to thereby engage cheese blocks between the flights and the belt.

* * * * *